Dec. 16, 1930.    K. E. PEILER    1,785,209
APPARATUS FOR GATHERING GLASS
Filed April 21, 1925
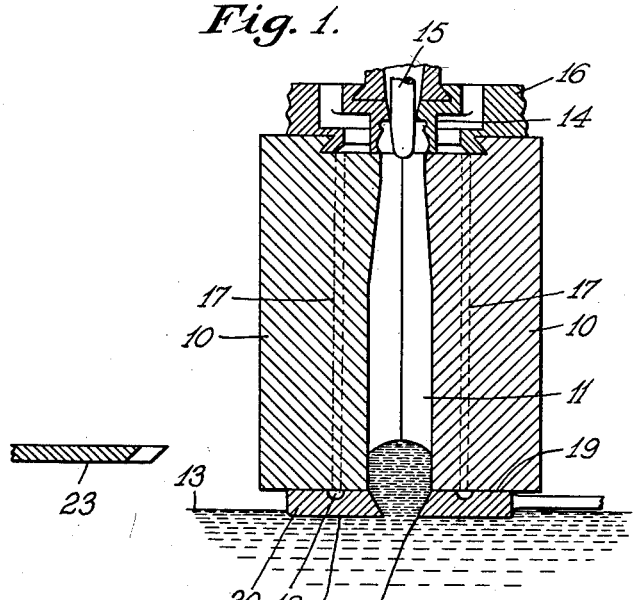
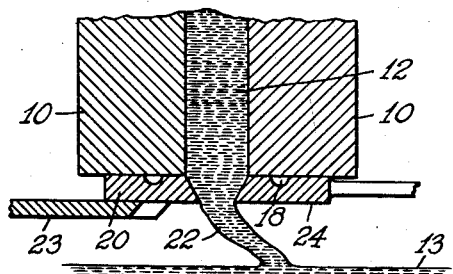
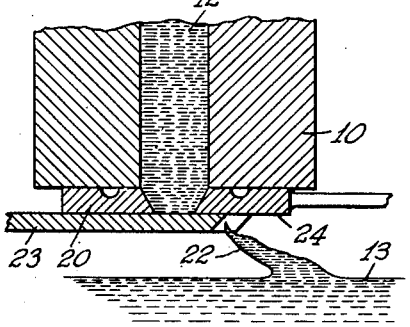
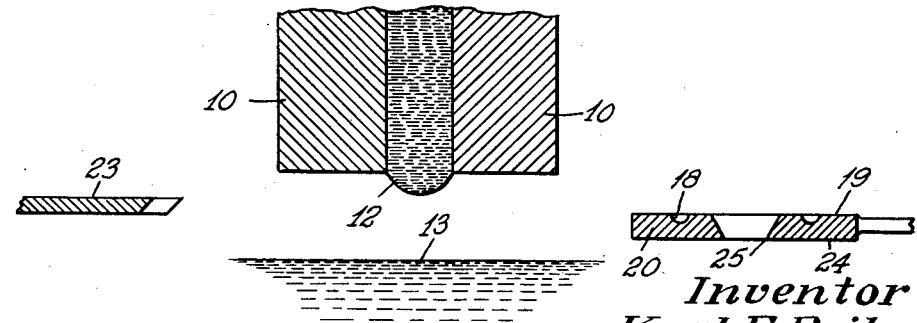
Inventor
Karl E. Peiler
by Robt. D. Brown
Attorney.

Patented Dec. 16, 1930

1,785,209

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

APPARATUS FOR GATHERING GLASS

Application filed April 21, 1925. Serial No. 24,789.

My invention relates to suction-fed molds for making glassware, and its object is to provide an improved severing means for use with molds of the Owens suction-fed type.

Various troubles have been experienced with suction-fed machines in respect to cutting off the surplus glass at the bottom of the parison mold after the gathering operation. The parison mold is made in halves, and it is difficult to align the halves so that a shearing knife can be passed evenly across the joint. If there is an imperfect joint, the glass tends to smear between the knife and the bottom of the mold, causing unsightly markings on the bottom of the ware. A better shearing action has been obtained by inserting a hardened steel piece into the bottom of each of the mold halves to provide a cutting edge for the knife to work against. This does not solve the difficulty, as it is extremely difficult to maintain the proper alignment between the cutting edge of the knife and the junction of the halves of the steel ring.

According to my present invention, I overcome the above-mentioned difficulties by providing the bottom of the mold with a one-piece ring with which the cutting off knife cooperates. This ring is preferably composed of hardened steel, and it forms one member of a pair of shears, the other member of the shears being the usual cutting-off knife. The severing ring and the knife may be so mounted, guided and shaped with respect to each other as to secure a clean, efficient cut, thereby avoiding the troubles above mentioned.

A further advantage of this construction is that it provides means to compensate for any increase in the size of the mold cavity that may be caused by wear. In such cases, the bottom ring may be planed so as to reduce the capacity of the bottom ring sufficiently to balance the increase in the size of the body-mold cavity, the shearing level being correspondingly adjusted.

In the accompanying drawings:

Figure 1 is a central vertical sectional view of a suction mold and its cooperating parts in the position of gathering a mold charge from a supply of molten glass;

Fig. 2 is a view of the lower portion of Fig. 1, showing the mold raised after obtaining a mold charge and showing the unsevered glass between the mold and the gathering pool;

Fig. 3 is a similar view showing the severance of the glass; and

Fig. 4 is a similar view showing the collected and severed mold charge with the severing devices retracted.

In the drawings, the numerals 10 indicate the cooperating halves of a parison mold having a mold cavity 11 for forming a mold charge 12 collected by suction from a gathering pool 13. The mold is provided at its upper portion with neck-forming means including a neck ring 14 and a neck plunger 15, and is also provided with a suction head 16 for drawing the molten glass into the mold cavity 11. A one-piece severing ring 20, with which my invention is mainly concerned, is arranged for periodic cooperation with the bottom of the mold and when in position beneath the mold, the opening in this ring forms a continuation of the mold cavity.

The mold is provided with the usual leak grooves 17 which are located in the meeting surfaces of the mold halves 10 but which, for convenient illustration, are shown in Fig. 1 of the drawing as being turned ninety degrees from their actual position. The grooves 17 connect the suction head 16 with an annular leak groove 18 formed in the upper surface 19 of the severing ring 20 to aid in maintaining suction within the mold cavity 11. This leak groove may be formed in the mold instead of in the ring, if desired.

A shearing knife 23 is arranged to sweep across the bottom surface 24 of the shearing ring 20 and the edge of this knife cooperates with the inner edges 25 of the ring 20 to sever the depending portion 22 of molten glass from the bottom of the ring after the gather has been collected.

In operation, the ring 20 is brought against the lower end of the mold, so that for the time it becomes a portion of the mold. The mold and the ring 20 are then lowered to the surface of the gathering pool, as shown in Fig.

1, and the mold is filled with glass in the usual manner, by suction applied by the head 16. The mold 9 and the severing ring 20 are then raised from the pool 13, and the surplus glass is sheared off by moving the shear blade 23 across and in contact with the ring 20. Fig. 3 shows the completion of this severing operation. The knife 23 is then withdrawn from beneath the ring 20, and the ring is lowered away from the mold.

If desired, the mold, the ring and the knife may be separated by lifting the mold from the ring or by lowering the knife and the ring together before retracting them. In any case, the ring and the knife are finally brought to the retracted position shown in Fig. 4, leaving the parison in the mold, free for further manipulation.

The ring 20 and the knife 23 may be arranged to approach the mold from opposite sides, as shown in the drawing, or they may both be mounted at one side of the mold. The mechanism for reciprocating these parts and moving them vertically at the proper times is not illustrated herein and may be of any convenient construction.

The above-described operation may obviously be varied by raising and lowering the gathering pool to bring the glass periodically to the level of the bottom ring of the mold, instead of lowering and lifting the mold and its attachments.

This invention is not limited to the details of construction shown herein, but may be modified as desired within the scope of the appended claims.

I claim as my invention:

1. A split suction mold for glass working, comprising cooperating mold halves, an integral severing member provided with an orifice adapted to be moved horizontally into and out of vertical alignment with the mold cavity and adapted to be vertically reciprocated into and out of cooperative engagement with said mold, and a reciprocable shearing knife mounted independently of the severing member and adapted to move across the bottom surface of said member to sever surplus glass from the glass collected in said mold.

2. A split suction gathering receptacle for glass working, comprising cooperating longitudinal receptacle halves, a separate one piece annular severing member adapted to be moved into cooperative relation with the lower end of said receptacle and having an opening therein adapted to form a continuation of the receptacle cavity, said receptacle and said severing member being adapted to be separated by a substantially vertical bodily movement of one of them with respect to the other, and a reciprocable shearing member adapted to move across the bottom surface of said annular member in synchronism with the movements of the receptacle while said annular member is in cooperative relation with the receptacle.

3. A split suction glass gathering receptacle for glass working, comprising cooperating longitudinal receptacle halves, a one piece annular severing member provided with an orifice adapted to be moved into and out of vertical alignment with the receptacle cavity and to be vertically reciprocated into and out of position to supplement the receptacle cavity, and a reciprocable shearing member adapted to be moved across the bottom surface of the annular member in synchronism with the movements of the receptacle.

Signed at Hartford, Conn., this 17th day of April, 1925.

KARL E. PEILER.